May 6, 1958 J. R. PADRICK 2,833,599

STANDARD AND BEARING ASSEMBLY FOR A DISK BEDDER GANG

Original Filed March 26, 1953 4 Sheets-Sheet 1

INVENTOR.
JOHN R PADRICK
BY
Emerson B Donnell
Atty.

May 6, 1958 J. R. PADRICK 2,833,599

STANDARD AND BEARING ASSEMBLY FOR A DISK BEDDER GANG

Original Filed March 26, 1953 4 Sheets-Sheet 2

INVENTOR.
JOHN R PADRICK
BY
Emerson B Donnell
Atty.

May 6, 1958 J. R. PADRICK 2,833,599

STANDARD AND BEARING ASSEMBLY FOR A DISK BEDDER GANG

Original Filed March 26, 1953 4 Sheets-Sheet 3

INVENTOR.
JOHN R PADRICK

BY Emerson B Donnell
Atty.

STANDARD AND BEARING ASSEMBLY FOR A DISK BEDDER GANG

Original Filed March 26, 1953 4 Sheets-Sheet 4

INVENTOR.
JOHN R PADRICK
BY
Emerson B Donnell
Atty.

2,833,599

STANDARD AND BEARING ASSEMBLY FOR A DISK BEDDER GANG

John R. Padrick, Anniston, Ala., assignor to J. I. Case Company, Racine, Wis., a corporation of Wisconsin Original application May 26, 1953, Serial No. 357,401, now Patent No. 2,781,710, dated February 19, 1957. Divided and this application February 4, 1957, Serial No. 642,922

2 Claims. (Cl. 308—19)

The present invention relates to improvements in a disk bedder gang and more particularly to a disk bedder gang having provisions for readily shifting the disk gang horizontally with respect to the direction of movement of the gang and vertically with respect to the horizontal so that the disk gang can be arranged to shift or throw dirt at any desired angle, when for instance the disk bedder gang is being operated on a hillside, or either toward or away from plants when the disk bedder gang is being used for cultivating row crops.

An object of the present invention therefore is to provide in a disk bedder gang, means for readily adjusting the disk gang horizontally with respect to the direction of travel of the gang, the disk gang being capable of being angularly shifted in increments ranging from a coarse adjustment to a fine adjustment.

A further object is to provide means for locking the disk gang in various tilted positions with respect to the horizontal, this adjustment being capable of being easily and readily made.

Another object is to provide a bearing construction for rotatably supporting the disk gang with respect to the standard, means being provided for readily compensating for the wear which occurs between the bearing surfaces so that the proper bearing surface fit is obtained at all times.

A still further object of this invention is to provide a disk bedder gang assembly which is relatively simple in design, which can be manufactured easily and inexpensively, and which performs its function in a highly efficient and economical manner.

This application is a division of application Serial Number 357,401, filed May 26, 1953, now Patent Number 2,781,710, issued February 19, 1957.

Figures 1, 4:
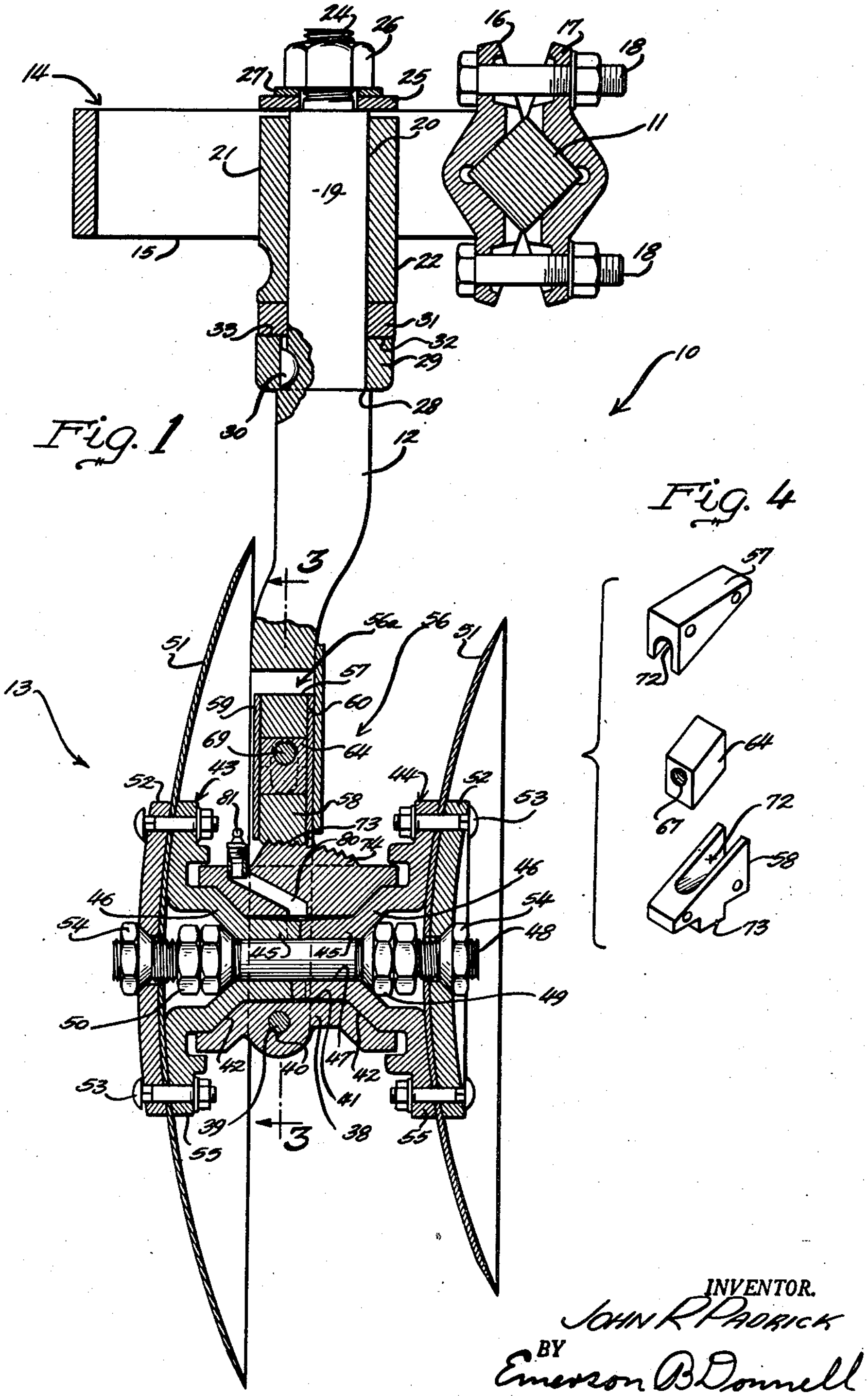
Fig. 1 is a right-side elevational view of a disk bedder gang assembly shown in combination with a tool bar, with parts broken away to show details in construction, and with parts removed.
Fig. 4 is a perspective view of certain structure shown in Fig. 2, slightly enlarged.
Figure 2:
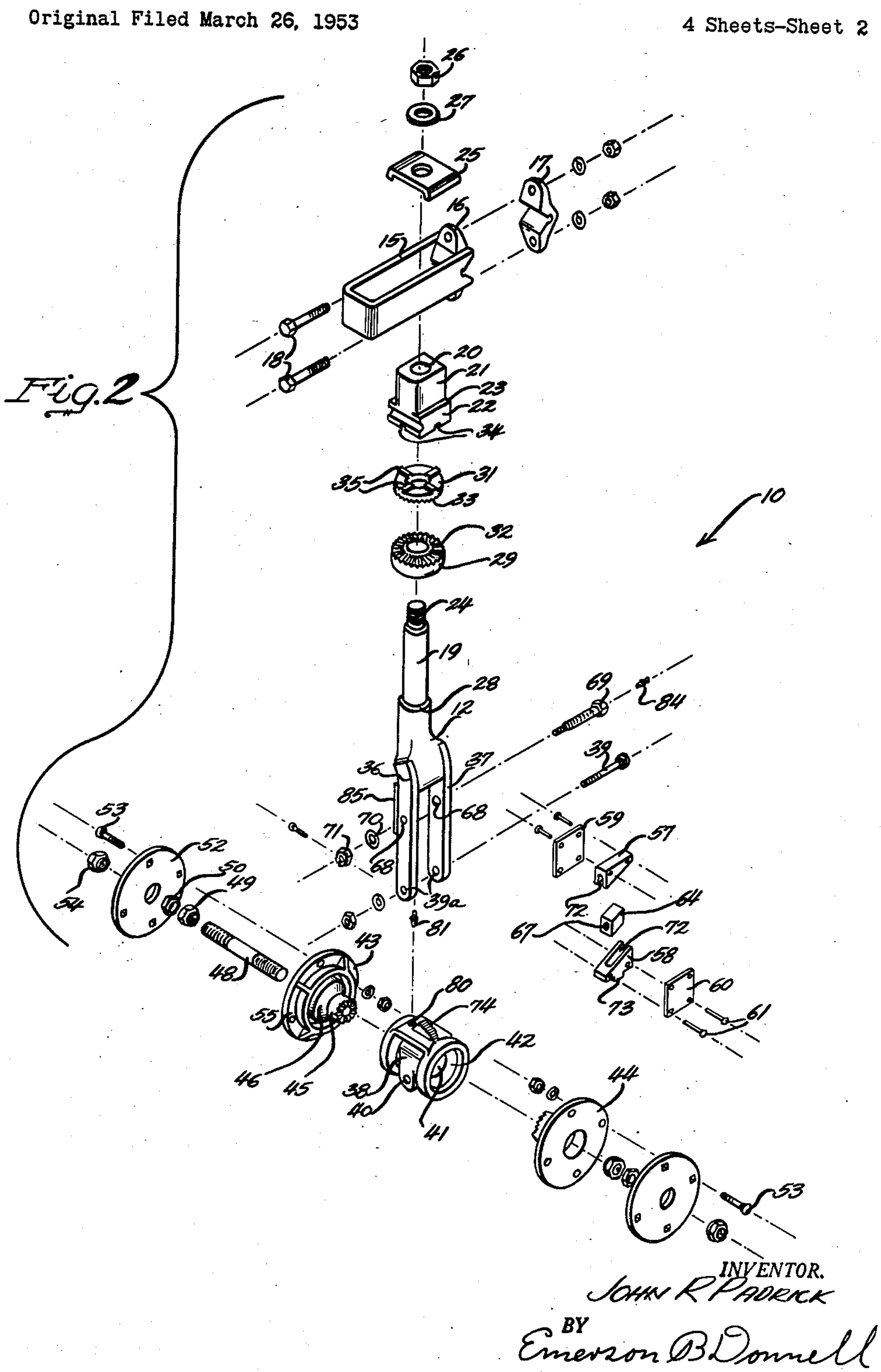
Fig. 2 is an exploded perspective view of certain structure shown in Fig. 1.

Referring to the drawings, the number 10 represents a disk bedder gang assembly in its entirety, this assembly embodying the principles of the present invention and shown as being rigidly supported in depending relationship with respect to a tool bar 11, the tool bar 11 being of any suitable or well-known construction and preferably of the type employed in association with a movably supported truck or in mounted relationship with respect to a tractor. The disk bedder gang assembly 10 comprises in the present instance a standard 12 which supports adjacent its lower end a disk gang broadly designated by the number 13, and the disk gang 13 is capable of being held in various tilted positions with respect to the standard 12 and with respect to the ground as will be more fully described and explained hereinafter. The upper end of the standard 12 is fixed in a supporting bracket 14 which in turn is clamped to the tool bar 11 in a manner which will be fully described presently.

The bracket 14 is preferably of fabricated construction, and comprises in the present instance a U-shaped rigid member 15 which has welded between the free ends thereof a clamp clevis 16 of any suitable or well-known construction. The clevis 16, in cooperation with a clamp clevis 17, is clamped in rigid fixed relationship to the tool bar 11 as by suitable bolts 18, the bolts 18 being received in suitable apertures formed in the respective clevises and being effective for drawing the clevises in clamping relationship to the sides of the tool bar 11 in a manner well-known in the art, the member 15 being supported in a substantially horizontally extending position with respect to the tool bar.

The standard 12 is provided with an upper stem portion 19, and this stem portion is rotatably received in a bore 20 formed in a bracket hub 21. The hub bracket 21 is preferably rectangular in cross-section and is readily slidably received in the U-shaped member 15 but is prevented, due to its size, from moving rotatably therein. The hub 21 is provided with an enlarged bottom portion 22 which has abutting surfaces 23 extending laterally from the opposite sides of the hub 21 so that when the hub 21 is moved upwardly in the U-shaped member 15 a predetermined distance, the surfaces 23 move into abutting relationship with respect to the opposite sides of the member 15. The upper end of the stem portion 19 is provided with a threaded portion 24, and a bridge 25 is received by the threaded portion 24 and interconnects or straddles the opposite sides of the member 15. A suitable nut 26 is threadedly received on the threaded portion 24 and a washer 27 is received on the threaded portion 24 and positioned between the nut 26 and the bridge 25.

The stem portion 19 is provided with a shoulder 28, and a rosette 29 is slidably received on the stem portion 19 and is keyed thereto as by a suitable key 30, the rosette 29 being positioned in abutting relationship with respect to the shoulder 28 and being held against rotative and axial movement with respect thereto. A rosette 31 is slidably received on the stem 19 adjacent rosette 29. The upper surface of the rosette 29 is provided with a plurality of radially extending serrations or teeth 32, and the lower surface of the rosette 31 is provided with a plurality of radially extending serrations or teeth 33, the serrations 32 being the complement of the serrations 33. The mating surface of the portion 22 of the bracket hub 21 with respect to the rosette 31 is provided with serrations, these serrations including in the present instance four equally spaced radially extending slots 34, and the mating surface of the rosette 31 with respect to the bracket hub 21 is formed with serrations which in the present instance include four equally spaced radially extending lugs or teeth 35, the lugs 35 being capable of being received in the slots 34 for preventing rotative movement of the rosette 31 independently of the bracket hub 21 and for holding the rosette 31 in various indexed angular positions with respect to the rosette 29 as will be more fully explained hereinafter.

It will be appreciated that when the nut 26 is turned so as to be drawn on the threaded portion 24, the standard 12 will be caused or urged to move upwardly until the abutting surfaces 23 of the bracket hub 21 are moved into abutting relationship with respect to the opposite sides of the U-shaped member 15. When the nut 26 is turned further in this direction, the bridge 25 and the surfaces 23 of the bracket hub 21 are moved into clamping relationship with respect to the U-shaped member 15 so that the standard 12 is rigidly held in the member 15. It will be noted that the hub 21 is capable of being moved in a fore-and-aft direction in the member 15 so that the standard 12 can be clamped therein in a plurality of fore-and-aft positions with respect to the tool bar 11. It will be appreciated of course that the lugs 35 are received in the slots 34 and that the complementary serrations 32 and 33 are in intermeshing relationship when the standard 12 is rigidly fixed in its depending position with respect to the tool bar 11, the rosette 29 as previously suggested being keyed to the standard 12 so as to hold the disk gang 13 in its predetermined horizontally angled position with respect to its direction of travel.

The horizontal angling adjustment of the disk gang 13 with respect to its direction of travel is controlled by the serrated mating surfaces of the rosettes 29 and 31 and by the lugs 35 formed on the rosette 31 and by the slots 34 formed on the bracket hub 21. Each of the serrated mating surfaces of the rosettes 29 and 31 in the present instance has an odd number of serrations or teeth formed thereon. Because the rosette 31 has an odd number of serrations or teeth formed on the bottom surface thereof and an even number of lugs or teeth formed on its top surface to fit into the cross-slots 34 in the bracket hub 21, the relation of the serrations 33 to the center line of the lugs 35 will be different under the center line of each lug, and this relation will change progressively around the circumference according to the number of serrations and the number of lugs formed on the rosette. Therefore, by rotating or turning the rosette 31 into a different lug and slot fit, the rosette 31 being clear of the rosette 29 so as to be rotatable independently thereof, the center lines of the teeth of serrations 33 will be offset slightly in one direction with respect to the center lines of the teeth of serrations 32 so that when rosette 29 is moved back into intermeshing relationship with respect to rosette 31, the horizontal angle of the rosette 29 and consequently of the disk gang 13, will be changed some fraction of the coarse adjustment, the extent to which said disk gang is angularly adjusted being determined by the number of teeth on the serrated mating surfaces of rosettes 29 and 31, the number of lugs 35 and slots 34 on rosette 31 and bracket hub 21 respectively, and the extent to which the rosette 31 is turned into a new lug and slot fit relative to the rosette 29. For instance, if each serrated face of rosettes 29 and 31 has forty-five serrations or teeth formed thereon, the top surface of rosette 31 still being formed with its four lugs 35 and the bottom surface of the hub 21 being formed with its four slots 34, the disk gang 13 will be caused to swing in either direction in increments of 8° every time the bottom rosette 29 is turned relative to the top rosette 31 one serration or tooth. Since the serrations 32 and 33 have an odd number of teeth, and since the lugs 35 and the slots 34 are even in number, a horizontal adjustment of the disk gang 13 in increments less than the change effected when the rosette 29 is turned one tooth relative to the rosette 31 in either direction will be effected when the rosette 31 is turned to a new lug and slot fit with respect to the hub 21. More specifically, when the rosette 31 is turned independently of the rosette 29 in one direction 90° to a new lug and slot fit, the center lines of the teeth of serrations 33 will be moved sufficiently into offset relationship with respect to the center lines of the teeth of serrations 32 to cause the disk gang to swing 2° in this one direction when the standard 12 is moved axially sufficiently in the U-shaped member 15 to cause the rosette 29 to move into intermeshing relationship with respect to the rosette 31 and to cause the rosette 31 to move into intermeshing relationship with respect to the hub 21. In the same manner the disk gang will be caused to swing angularly in this one direction 4° when the rosette 31 is moved 180° into a new lug and slot fit, and if the rosette 31 is turned in this one direction 270° to a new lug and slot fit, the disk gang will be caused to swing in this one direction a distance equal to 6°. In the same manner, the disk gang will be caused to swing in this direction 8° if the rosette 31 is turned 360° into a new lug and slot fit. It will be appreciated therefore that the disk gang 13 is caused to swing in increments of 2° every time the top rosette 31 is turned 90° to a new lug and slot fit, one complete turn of the rosette 31 in increments of 90° causing the disk gang 13 to swing in this direction through an arc of 8°. If the rosette 31 is swung instead 90° in the other direction to a new lug and slot fit, the disk gang 13 will be caused to swing 6° in this other direction. If the rosette 31 is turned 180° in this other direction to a new lug and slot fit, the disk gang will be caused to swing 4° in this other direction, and the disk gang will be caused to swing in this other direction 2° if the rosette 31 is turned relative to the rosette 29 270° to a new lug and slot fit. A complete revolution of the rosette 31 relative to the rosette 29 in this other direction will have no effect upon the angular position of the disk gang 13. It will be appreciated therefore that the disk gang 13 is capable of being angularly adjusted in either direction in increments of 8°, representing a coarse adjustment, or in increments of 2°, representing a fine adjustment.

Before the operation is able to turn either the rosette 29 relative to the rosette 31 or the rosette 31 relative to the hub 21 and the rosette 29, the lock nut 26 must first be threaded off the portion 24 until the serrations 32 and 33 are sufficiently clear from one another to permit rotative movement of the rosette 31 relative to the rosette 29 and until the lugs 35 are sufficiently clear of the slots 34 to permit relative rotation of the rosette 31 with respect to the hub bracket 21. When the disk gang 13 has been moved to its desired angled position with respect to its direction of travel, the locking nut 26 is again drawn tightly on the threaded portion 24 so as to effect positive indexed locking of the disk gang 13 in its adjusted angled position.

The lower end of the standard 12 is bifurcated and includes spaced downwardly depending arms 36 and 37. A bearing 38 is tiltably carried between the arms 36 and 37 adjacent the lower ends thereof by means of a pivot bolt 39, the bolt 39 being received in suitable apertures **39*a* formed in the arms 36 and 37 and in an aperture 40 in the bearing 38. A central bore 41 is formed in the bearing 38, and the bore 41 adjacent its opposite ends diverges outwardly so as to form inclined bearing surfaces 42. A pair of funnel-shaped disk journals 43 and 44 are received in the opposite ends of the bearing 38. Each of the disk journals is provided with a hub portion 45 and a conical shaped bearing portion 46, and the bearing portions 46 are moved into bearing relationship with respect to the surfaces 42 when the hub portions 45 are inserted sufficiently into the opposite ends of the bore 41 to move into abutting relationship with respect to one another. Each of the journals 43 and 44 is provided with a central bore 47 which is substantially coaxial with respect to the central bore 41 of the bearing 38. An arbor bolt 48 is received in the central bore 47 of each of the journals, and suitable nuts 49 are threadedly received on the opposite ends of the arbor bolt and tightened with respect to one another sufficiently to move the hub portions 45 of the journals into abutting relationship, suitable jam nuts 50 being provided for preventing loosening of the nuts 49** in a manner well-known in the art.

The opposite ends of the arbor bolt 48 extend laterally beyond the ends of each of the journals 43 and 44, and suitably apertured disk blades 51 are received adjacent the opposite ends of the bolt. Apertured disk washers 52 are also received adjacent the opposite ends of the arbor bolt and suitable nuts 54, which are threaded on the opposite ends of the bolt, move each of the disk blades, together with its washer, into abutting relationship with respect to a peripheral flange 55 of each of the journals 43 and 44. Each of the disk blades 51 together with its washer 52 is nonrotatably secured to peripheral flange 55 by means of a plurality of circumferentially spaced carriage bolts 53 so that the journals 43 and 44 are caused to turn in the bearing 38 in response to rotative movement of the disk blades.

The disk gang 13 tilts or pivots vertically about the axis of bolt 39, and a vertical angling and positive locking means, broadly designated as 56, is provided for locking the disk gang in any one of a plurality of predetermined tilted positions with respect to the horizontal. Angling and locking means 56 includes a wedge locking assembly *56a* which consists of a pair of slide blocks 57 and 58 held by means of plates 59 and 60 and bolts 61 in vertically spaced relationship. Opposite or facing surfaces 62 and 63 of blocks 57 and 58 are in parallel inclined relationship, and a slide 64 having upper and lower surfaces 65 and 66 positioned in parallel inclined relationship with respect to surfaces 62 and 63 is slidably received between block 57 and block 58, the slide 64 being formed of a size so as to be readily slidable against the surfaces 62 and 63 of the blocks. A substantially horizontally disposed threaded opening 67 is formed in the slide 64, and openings 68 are formed in the arms 36 and 37 in substantially horizontally aligned relationship. A bolt 69 passes through openings 68 formed in the arms 36 and 37 and is threadedly received in the opening 67 formed in the slide 64 so that the blocks 57 and 58 are supported between the arms 36 and 37. The bolt 69 receives adjacent its end a suitable washer 70 and a lock nut 71 for holding the bolt 69 with respect to axial movement in the opening 68 while still permitting rotative movement of the bolt therein. Each of the blocks 57 and 58 is provided with a suitable dished-out or bolt-receiving recess 72 for accommodating therein the bolt 69 when the slide 64 is moved axially thereon in one direction as will be more fully appreciated hereinafter. The bottom surface of the block 58 is provided with a toothed rack portion 73, and the bearing 38 adjacent the top thereof is provided with an arcuate axially extending toothed rack portion 74, the teeth of the rack portion 73 being caused to move into intermeshing relationship with respect to the teeth of the rack 74 for locking the disk gang 13 in any one of a plurality of predetermining tilted positions with respect to the horizontal as will now be described in more detail.

Figure 3:
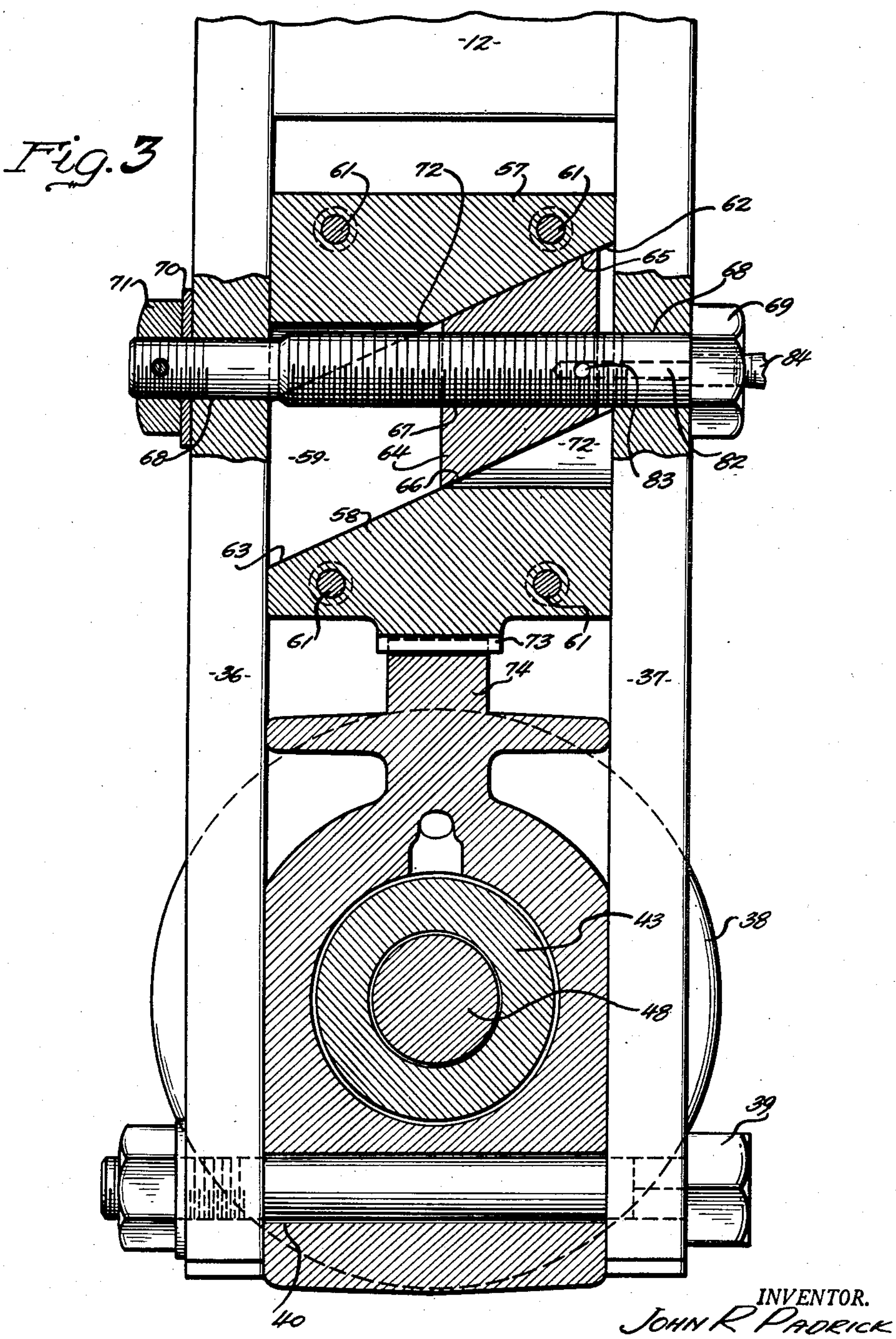
Fig. 3 is a vertical sectional view, slightly enlarged, taken on the line 3—3 of Fig. 1, with parts removed.
Figures 5, 6:
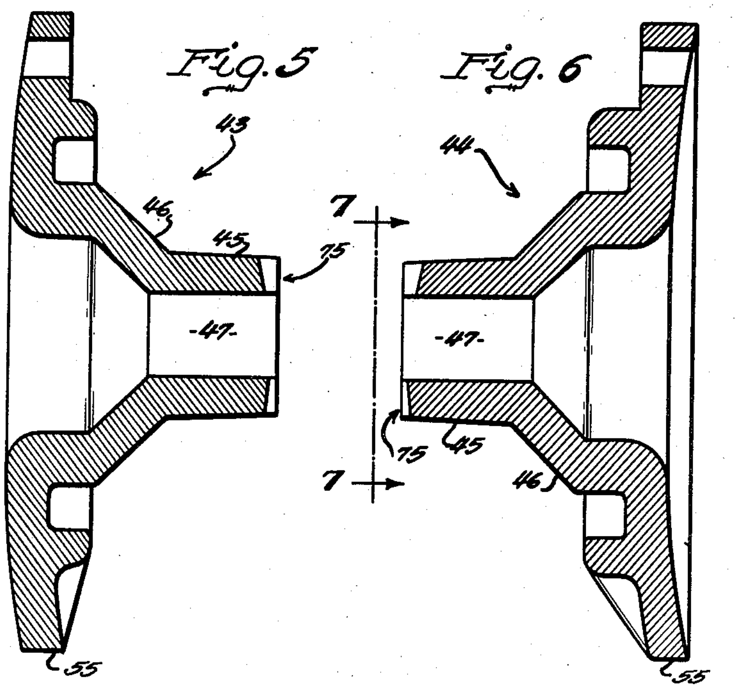
Fig. 5 is a vertical sectional view, slightly enlarged, of a disk journal shown in Fig. 1.
Fig. 6 is a vertical sectional view, slightly enlarged, of a disk journal shown in Fig. 1.
Figure 7:
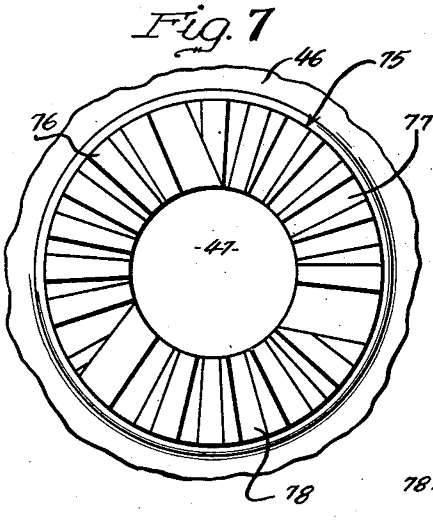
Fig. 7 is an end view looking in the direction of the line 7—7 of Fig. 6, slightly enlarged, and with parts removed.
Figure 8:
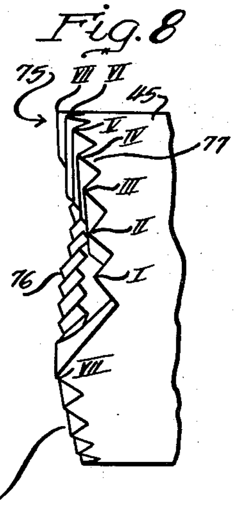
Fig. 8 is a side-elevational view of the structure shown in Fig. 7.
Figure 9:
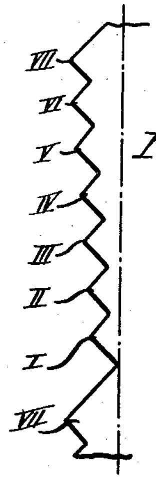
Fig. 9 is a section of the teeth shown in Fig. 8 projected on a flat surface.

If it is desired to move the disk gang 13 into a different tilted position with respect to the horizontal, the bolt 69 is first turned in one direction, by means of a wrench or other suitable tool, so as to cause the slide 64 to move axially on the bolt 69 to the left as viewed in Fig. 3. As the bolt 69 is turned so as to move the slide 64 to the left, the slide bears against the surface 62 and forces the block 57 upwardly, and inasmuch as the block 57 is interconnected to the block 58 by means of plates 59 and 60, the block 58 will be caused to move upwardly to the same extent that block 57 is forced upwardly. When the slide 64 has been moved to the left a predetermined distance, the block 58 will have been caused to move upwardly a distance sufficient to move the teeth of the rack 73 out of intermeshing relationship with respect to the teeth of the rack 74. The disk gang 13 is then capable of being tilted in either direction about the axis of bolt 39. When the disk gang 13 has been manually moved into its proper tilted position, it is held in this position, and the bolt 69 is turned in the opposite direction so as to cause the slide 64 to move to the right. When the slide 64 is caused to move to the right, the surface 66 of the slide bears against the surface 63 of the block 58 which forces the block 58 downwardly. When the slide 64 has been moved to the right a predetermined distance, the block 58 will have been caused to move downwardly a distance sufficient to move the teeth of the rack 73 into intermeshing and locking relationship with respect to the teeth of the rack 74. The disk gang 13 is then locked in its newly adjusted tilted position.

The teeth of the rack 73 and the teeth of the rack 74 in the present instance are preferably formed of a size so as to permit tilting of the disk gang 13 relative to the horizontal in increments of 3°; however, it will be appreciated that the teeth of the racks 73 and 74 can be formed of any desired size for causing tilting of the disk gang in increments of any suitable or desirable number of degrees.

As previously suggested, the disk journals 43 and 44 are held in abutting relationship in the bore 41, the bearing portions 46 of the journals being in bearing relationship with respect to the inclined bearing surfaces 42 of the bearing 38, by means of the arbor bolt 48. Inasmuch as the distance between the bearing portions 46 of the journals when the journals are held in abutting relationship with respect to one another is rather critical, and inasmuch as wear between the bearing portions 46 and the bearing surfaces 42 can possibly develop a certain amount of play between the respective journals and the bearing 38, provision is made whereby one of the journals can be locked in different indexed positions with respect to the other journal for changing the effective distance between the respective bearing portions 46 for compensating for this wear. More specifically, the abutting ends of the hub portions 45 of the journals 43 and 44 have formed thereon matching or complementary serrated surfaces broadly indicated at 75. Inasmuch as the serrated surface 75 of one journal is the complement of the serrated surface 75 of the other journal, further discussion will be limited to the serrated surface of journal 44 except in-so-far as a detailed description of the serrated surfaces of each of the journals is deemed necessary for a full understanding of this index adjusting means. The serrated face 75 is preferably formed of three sets of teeth 76, 77, and 78, each set of teeth being formed on a circumference of 120° and each set including seven teeth, the corresponding teeth of each set being indicated by Roman numerals I, II, III, IV, V, VI, and VII. The teeth of each set are formed on an inclined plane, and considering the tooth I of each set as a reference point, the teeth of each set increase progressively in height from tooth I to tooth VII, the distance between the crest of each of the teeth being the same and the angles of the sides of the teeth being the same. There is formed therefore a staircase effect in each of the three sets of teeth 76, 77, and 78 which is effective for spacing the bearing portions 46 of the journals in various predetermined spaced-apart positions when the journal 44 is locked in various indexed positions with respect to the journal 43. It will be noted that the distance from the crest of each of the teeth VII to the crest of its adjacent tooth I is equal to the space of another complete tooth. There are therefore eight tooth spaces for each set of teeth 76, 77, and 78 and seven teeth formed in each set of teeth 76, 77, and 78 so that the journal 44 is indexed with respect to the journal 43 in increments of 15° every time the disk journal 44 is turned one tooth relative to the journal 43.

In assembling the disk journals 43 and 44 in the bearing 38, the bearing portions 46 are positioned in their maximum spaced-apart relationship when the teeth VII of the journal 43 are in the roots between the teeth VII and the teeth VI of the journal 44. As wear occurs between the bearing portions 46 and the bearing surfaces 42 so that play develops in the bearing assembly, it is necessary to turn the journal 44 into a different indexed position with respect to the journal 43 in order to compensate or take up this wear. In order to do this, the disk blade 53 which is fixed to the journal 44 is removed therefrom and the lock nut 49 and jam nut 50 which hold the journal 44 in abutting relationship with respect to the journal 43 is loosened sufficiently to permit rotative movement of one journal relative to the other. The journal 44 is then turned so that the teeth VI and VII of the journal 43 are moved into intermeshing relationship with respect to the tooth VI and VII of the journal 44. If the journal 44 were then locked with respect to journal 43 in this new indexed position, the distance between the bearing portions 46 would be decreased a difference equal to the increase in height between teeth VI and teeth VII. If the play between the bearing portions 46 and the surfaces 42 had developed to the extent that a greater adjustment was necessary, the journal 44 could be turned so that the teeth VII, VI, and V of journal 43 are moved into intermeshing relationship with respect to teeth VII, VI, and V of journal 44. It will be appreciated therefore that the journal 44 can be locked with respect to the journal 43 in seven different indexed positions and that each indexed position will effect a different spacing between the bearing portions 46 of the journals when the journals are locked in abutting relationship. It will be appreciated that when the journal 44 is indexed with respect to the journal 43 so as to position the teeth VII of the journal 43 in the roots between the teeth VII and teeth I of the journal 44 that the bearing portions 46 are locked in their closest spaced-apart relationship with respect to one another.

A lubricating duct 80 is formed in the bearing 38 and empties at one end into the bore 41. The other end of the duct receives a grease fitting 81 of any well-known or suitable construction. The bolt 69 is also provided with a lubricating duct 82 which empties by means of a crossduct 83 at the outer circumference of the threaded portion of the bolt 69. The other end of the duct 82 receives a suitable grease-fitting 84 for well-known purposes.

Referring once again to the wedge locking assembly **56*a*, a plate 85 is welded to the arms 36 and 37 and is so positioned as to prevent tilting or swinging of the wedge locking assembly about the axis of the bolt 69 when the bolt 69 is turned for axially moving the slide 64**.

What I claim is:

1. A bearing assembly including a bearing housing having a central bore formed therein, said central bore diverging outwardly adjacent its opposite ends so as to form conical bearing surfaces, a pair of journals, each of said journals having a conical shaped bearing portion and a hub portion, the bearing portions of said journals being caused to move into bearing relationship with respect to said bearing surfaces of said bearing housing when the hub portions of said journals are inserted in the opposite ends of said central bore, each of said journals having formed therein a bore substantially coaxial with said central bore, and an arbor bolt received in said bore and effective for urging said journals into abutting relationship, the abutting ends of said journals having formed thereon complementary serrations, said serrations being formed on an inclined plane so that the effective distance between said bearing portions when said journals are held in abutting relationship can be changed upon locking the journals in different indexed positions.

2. A bearing assembly including a bearing housing having a central bore formed therein, said central bore diverging outwardly adjacent its opposite ends so as to form conical bearing surfaces, a pair of journals, each of said journals having a conical shaped bearing portion and a hub portion, the bearing portions of said journals being caused to move into bearing relationship with respect to said bearing surfaces of said bearing housing when the hub portions of said journals are inserted in the opposite ends of said central bore, each of said journals having formed therein a bore substantially coaxial with said central bore, and an arbor bolt received in said bore and effective for urging said journals into abutting relationship, the abutting ends of said journals having formed thereon a plurality of intermeshing teeth, the teeth formed on each of said ends being formed on an inclined plane, the distance between the crest of each of the teeth being the same and the angles of the sides of the teeth being the same so that when one journal is indexed with respect to the other so that less than all of the teeth are in intermeshing relationship the distance between the bearing portions will be greater than when the journals are indexed so that all of the teeth are in intermeshing relationship.

References Cited in the file of this patent

UNITED STATES PATENTS

| | | |
|---|---|---|
| 1,692,007 | Van Brunt | Nov. 20, 1928 |
| 1,746,978 | Winkler | Feb. 11, 1930 |
| 1,825,410 | Manckmeier | Sept. 29, 1931 |
| 2,405,889 | Kennedy | Aug. 13, 1946 |